S. McGREGOR.
Car Seat and Couch.
No. 27,645.
Patented Mar. 27, 1860.
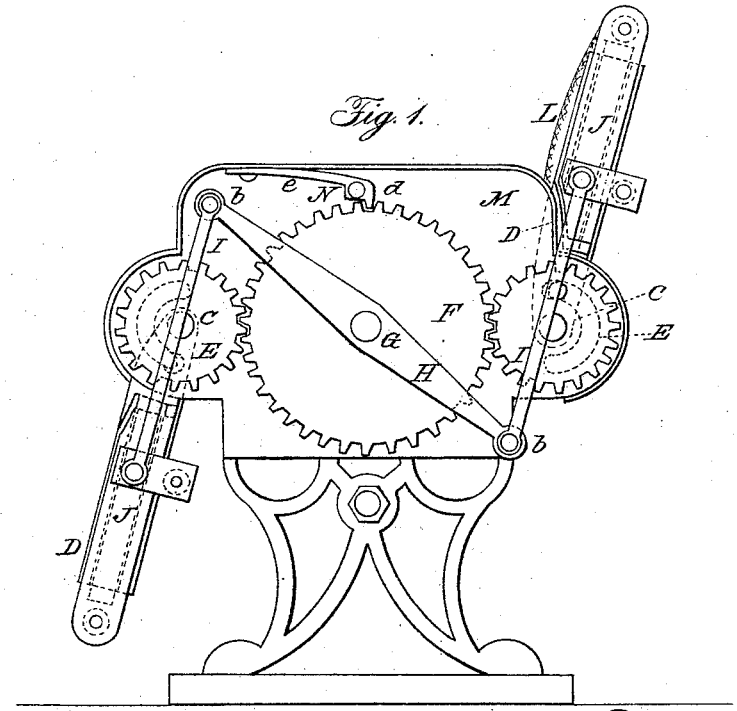
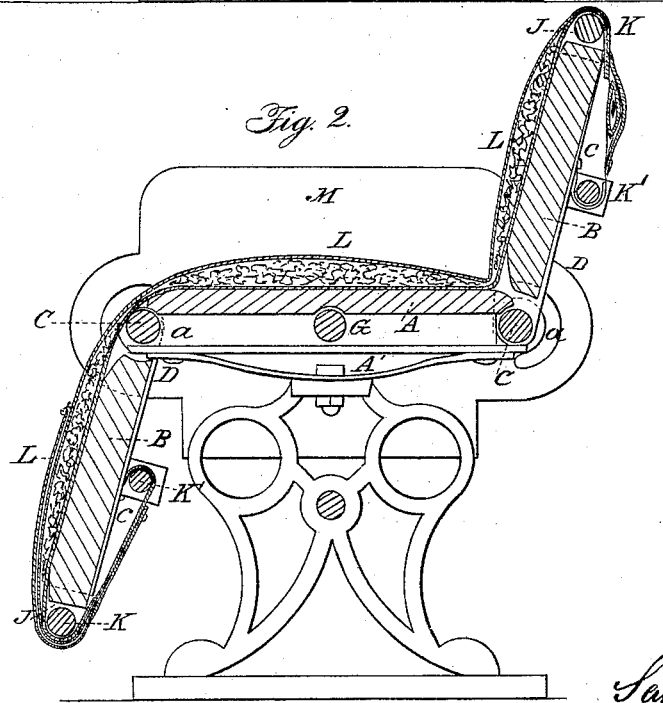
Witnesses:
Inventor:

UNITED STATES PATENT OFFICE.

SAMUEL McGREGOR, OF LOGANSPORT, INDIANA.

CAR-SEAT.

Specification of Letters Patent No. 27,645, dated March 27, 1860.

*To all whom it may concern:*

Be it known that I, SAMUEL McGREGOR, of Logansport, in the county of Cass and State of Indiana, have invented a new and Improved Railroad-Car Seat; and I do hereby declare that the following is a full, clear, and exact description of the same, reference being had to the annexed drawings, making a part of this specification, in which—

Figure 1, is a side view of a car seat, constructed according to my invention; Fig. 2, a side sectional view of the same.

Similar letters of reference indicate corresponding parts in the two figures.

This invention relates to an improvement in that class of car seats, in which adjustable backs are employed for converting, when necessary, the seats into lounges or couches.

The invention consists in having two backs attached to each seat, and connected by gearing and having the upholstery connected with certain automatic mechanism, all being so arranged, that the backs may be more or less inclined and correspondingly increased in height as desired, one being used as a support to the lower extremities of the occupants, and either used as a back, as occasion may require; the upholstery in consequence of its connection, with the mechanism above referred to being allowed to conform automatically to the adjustment of the backs.

To enable those skilled in the art to fully understand and construct my invention I will proceed to describe it.

A represents a car seat supported at a suitable height as usual.

B, B, represent two backs the lower ends of which are attached to shafts or rods C, at each edge of the seat A.

The backs B, B, at each side are provided with a grooved bar D, and the inner ends of these bars are provided with loops or eyes *a*, which are fitted loosely on the shafts or rods C, and form the attachment of the backs B, to said shafts or rods. The inner ends of the bars B, B, have toothed wheels E, E, attached to them, one to each. These wheels E, are concentric with the eyes *a*, and turn loosely on the shafts or rods C, and gear into wheels F, which are attached to the ends of a shaft G, underneath the seat A. To each end of the shaft G, there is an arm or lever H, secured, the ends of which have rods I, connected to them by joints *b*, as shown clearly in Fig. 1. The outer ends of the rods I, are connected to slides J, which are fitted in the grooves of the bars B, and the outer parts of the slides J, have rollers K, fitted between them, said rollers being parallel with the shafts or rods C. The inner ends of the slides have rollers K', attached to them.

L, represents the upholstery which is attached to the inner sides of the backs B, B, the cushion also passing over the rollers K, K', and being attached at its ends to the outer sides of the backs B, B, as shown at *c*, Fig. 2.

The seat A, is provided with sides M, and to one of the sides a stop N, is attached which catches into one of the wheels F, see Fig. 1. This stop is simply a pawl or catch *d*, formed at one end of a spring *e*, which has a tendency to keep the pawl or catch engaged with the wheel and prevent the rotation of the latter.

The operation is as follows: When one back B, is but slightly inclined from a vertical position above the seat, the other is inclined in a corresponding position below it, and performs no special function, the back above the seat performing the office of the usual back to seats. In this adjustment of the backs the seat is used as a day seat as will be readily seen by referring to Figs. 1 and 2.

By raising the stop N, free from its wheel F, the backs B, may be inclined more or less, both moving simultaneously in opposite directions in consequence of being connected by the gearing E, E, F. As the backs B, B, approach a horizontal position with the seat A, the slides J, are forced or moved outwardly the movement of the levers or arms H, on the rods I, and the rollers K, K, and K', K', extend the cushion L, and consequently extend the backs the seat being then converted into a couch. As the backs are made to approach a vertical position the rollers K', take up the slack of the cushion and always keep it strained smoothly over the backs and seat, the backs are retained at any desired inclination within the scope of their movement by the stop N.

The portions of the cushion L, that extend over the rollers K, K', may be but slightly padded, and in fact may not be padded at all as the extremities only of the occupants come in contact with them, any additional upholstering however may be used if desired to compensate for the same. The seat A, may be fitted on springs A', one at each end, see Fig. 2, in which one spring is shown.

Having thus described my invention what I claim as new and desire to secure by Letters Patent, is—

The backs B, B, attached to the seat A, and connected by the gearing E, F, in connection with the stop N, arms or levers H, rods I, and slides J, connected to the bars D, of the backs and provided with the rollers K, K', the seat and backs being provided with the continuous cushion L, passing around the rollers K, K', with its ends attached to the backs B, all being arranged substantially as and for the purpose set forth.

SAML. McGREGOR.

Witnesses:
JOHN R. FLYNN,
LYMAN R. LEGG.